United States Patent [19]
Whang

[11] Patent Number: 5,407,593
[45] Date of Patent: Apr. 18, 1995

[54] POLYMERIC ELECTROLYTE

[75] Inventor: Wha-Tzong Whang, Hsinchu, Taiwan, Prov. of China

[73] Assignee: National Science Council, Taipei, Taiwan, Prov. of China

[21] Appl. No.: 152,409

[22] Filed: Nov. 15, 1993

[51] Int. Cl.⁶ ............................................. H01G 9/02
[52] U.S. Cl. .................................... 252/62.2; 429/192
[58] Field of Search ................ 252/62.2, 500; 429/192

[56] References Cited

U.S. PATENT DOCUMENTS

| | | | |
|---|---|---|---|
| 4,589,197 | 5/1986 | North | 429/192 |
| 5,041,346 | 8/1991 | Giles | 429/192 |
| 5,061,581 | 10/1991 | Narang et al. | 429/192 |
| 5,102,751 | 4/1992 | Narang et al. | 429/192 |
| 5,256,335 | 10/1993 | Byrd et al. | 252/500 |

OTHER PUBLICATIONS

Journal of Power Sources, 14 (1985) 13-21.
Solid State Ionics, II (1983), 227-233.

Primary Examiner—Prince Willis, Jr.
Assistant Examiner—Alan D. Diamond
Attorney, Agent, or Firm—Lackenbach Siegel et al.

[57] ABSTRACT

A polymeric electrolyte includes a polar polymer matrix, a dissociable salt and a non-volatile polar polyether or polyester oligomer with terminal groups halogenated. Films prepared from the polymeric electrolyte have superior room temperature ionic conductivity and chemical stability.

6 Claims, No Drawings

POLYMERIC ELECTROLYTE

BACKGROUND OF THE INVENTION

1. Field of the Invention

This invention relates to a polymeric electrolyte having good room temperature ionic conductivity, more particularly to a polymeric electrolyte film having good room temperature ionic conductivity and chemical stability, in which a non-volatile polar oligomer polyether or polyester with terminal groups halogenated is used as a plasticizer.

2. Description of the Prior Art

Polymeric electrolytes can be processed to form films for the production of thin film batteries with a thickness of less than $100\mu$. Such batteries have a wide variety of uses, for example as power supplies of smart cards, calculators, portable computers, electrical appliances, IC chips and solar energy storage. In addition, solid polymeric electrolytes have other uses, for example in solar batteries, monitors, sensors, and the applications in electrochemistry and photoelectrochemistry.

The main path for ion transportation in a polymeric electrolyte is via the amorphous region of a polymer matrix. Thus, the ionic conductivity of a polymeric electrolyte can be increased by diminishing the crystalline region and increasing the amorphous region of the polymer matrix. The methods frequently used are: (1) preparing a new polymer such as copolymer or polymer with network structure; (2) adding non-soluble additives to improve the electrolytic property; and (3) adding soluble additives to provide a new path for ionic conductivity.

Polymers having high-dielectric constants, including poly(vinylidene fluoride)($\epsilon=8–13$), poly(ethylene succinate)($\epsilon=5.0–5.5$), poly(ethylene adipate)($\epsilon=5.2$) and poly(acrylonitrile)($\epsilon=3.1–4.2$) are all good matrices for preparing polymeric electrolytes. However, because they all have high glass transition temperatures or a high degree of crystallinities, the resulting polymeric electrolytes are not as good as desired. Adding some polar organic solvents, such as propylene carbonate, ethylene carbonate, or N,N-dimethylformamide and butyrolactone to such polymeric electrolytes, can indeed improve the ionic conductivities thereof, however, it is still hard to attain an ionic conductivity of $10^{-4}$ S/cm at room temperature. Furthermore, the organic solvents will volatilize, and thus changes the properties of the polymeric electrolyte.

Tsuchida et al. disclose a polymeric solid electrolyte prepared by adding a poly(ethylene oxide) oligomer having an average molecular weight of 400, and a terminal hydroxy groups acetylated poly(ethylene oxide) oligomer to poly(methacrylic acid). The polymeric solid electrolyte demonstrated an ionic conductivity of about $10^{-6}$ S/cm at room temperature.[Solid State Ionics, 11, 227(1983)]

Kelly et al. disclose that the conductivity of poly(ethylene oxide) doped with lithium salt, and plasticized with poly(ethylene glycol) having terminal hydroxy groups methylated can attain about $10^{-5}$ S/cm at $30°$ C. [J. Power Sources, 14, 13(1985)].

The conductivity of a polymeric electrolyte must be greatly improved if it is to be used in lithium-based film batteries. Moreover, since poly(ethylene glycol)s are terminated with hydroxy groups which are readily reacted with other ingredients, they are not suitable for use in polymeric electrolytes, and thus should not be used in the manufacture of thin film batteries.

SUMMARY OF THE INVENTION

A general object of this invention is to provide a polymeric electrolyte having good room temperature ionic conductivity.

Another object of this invention is to provide a chemically stable polymeric electrolyte, which will not react with electrodes made of alkali metal or inorganic compound, thus maintaining the good conductivity of the electrolyte.

Still another object of this invention is to provide a polymeric electrolyte containing no volatile components thereby assuring no change in conductivity and composition due to the volatilization of some compounds contained therein, and thus keeping the conductivity thereof constant.

A further object of this invention is to provide a polymeric electrolyte which can easily be formed into a film having good conductivity, and in which the preparation is simple and the starting materials are inexpensive.

A still further object of this invention is to provide a polymeric electrolyte in which an electrically conductive polymer can be doped by way of blending, electrochemical polymerization, oxidation-reduction reaction, or so forth, so that the resultant product possesses both ionic conductivity and electrical conductivity.

It now has been found by the inventor that polyether oligomers or polyester oligomers with terminal hydroxy groups halogenated are chemically stable, non-volatile, still polar in their terminal groups but chemically nonreactive, and therefore can be mixed with polar polymer matrix and dissociable salts to form polymeric electroytes having good room temperature ionic conductivity.

Based on the above finding, the polymeric electrolytes of the present invention include (a) a polar polymer matrix, (b) a dissociable salt, and (c) a plasticizer of polyether or polyester oligomer with terminal groups halogenated. The plasticizers of the invention are:

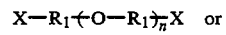

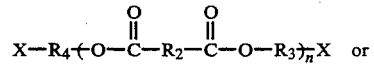

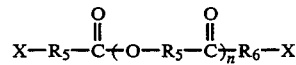

wherein X is a halogen atom selected from the group consisting of fluorine, chlorine, and bromine; $R_1$, $R_2$, $R_3$, $R_4$, $R_5$, and $R_6$ are independently an aliphatic group having less than 12 carbon atoms, and the polymerization degree n is an integer less than 250.

DETAILED DESCRIPTION OF THE INVENTION

According to the present invention, in order to make the dissociable salts have higher dissociation in a polymer matrix, the polymer matrices suitable for use in the invention must have high concentration polar groups in their structure, higher flexibility in their main chains, low coalescence energy and high dielectric constant. Examples of polar polymer matrices are:

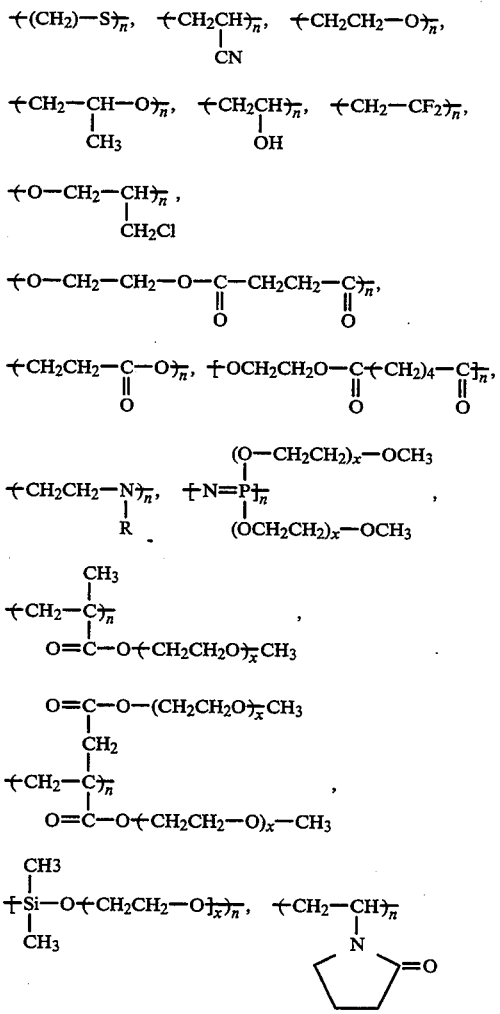

Similar linear polymers, crosslinked polymers or copolymers are also suitable for use in the present invention.

According to the present invention, the dissociable salts doped into polymeric electrolytes for thin film batteries are primarily alkali metal salts. The polymeric electrolytes for other particular uses such as sensors and electrochemical applications can be doped with specific alkaline earth metal salts, transition metal salts or organic salts. Viewed from the energy base, only when the lattice energy of the salt is less than the solvation energy of the polymer matrix is a salt dissoluble in a polymeric electrolyte. Since all the polymer matrices of this invention contain oxygen, nitrogen or phosphorus, they are provided with a pair of unshared electrons, and thus can facilitate the solvation reaction.

According to the present invention, the polyether or polyester oligomers with terminal groups halogenated are polar oligomers, and thus have a certain degree of mutual solubility with polar polymer matrices. Therefore, when they are added to a polar polymer matrix, they can destroy the crystalline region of the polymer matrix, thus decreasing its crystallinity and increasing the number of its amorphous region. This phenomenon can be proven by X-ray diffraction analysis and differential scanning calorimetry(D.S.C.). Because the amorphous region is the main conductive path of a polymeric electrolyte, increasing the amorphous region can therefore improve electrolyte conductivity. In addition, it is found that the polar plasticizers of the invention themselves are also a main path for ionic conductivity.

The amount of polar polymer matrix, dissociable salt and plasticizer used in the polymeric electrolyte of the invention vary with the application of the resulting polymeric electrolytes. For example, when the polymeric electrolytes are to be used in thin film batteries, higher room temperature ionic conductivity is required, so the content of the polymer matrix must be lowered, and currently in order to achieve good film formability, the content of the plasticizer must be increased and the content of the salt must be suitably adjusted. On the other hand, when the electrolytes are to be used in electrochromic devices, in which they act as a matrix for forming conductive complex film, and lower conductivity is required, the content of the polymer matrix must be increased and the content of the plasticizer and dissociable salts can be reduced. In this case, in order to form a conductive complex film in a single step, additional electrically conductive polymers and organic or inorganic salts can be added to the polymeric electrolyte of the invention, in which the organic or inorganic salts can oxidize the electrically conductive polymers when they are formed into complex film.

However, in order to attain the objects of the invention, polar polymer matrix is added in quantities ranging from 10 to 95 mol %, dissociable salts are added in quantities rangeing from 2 to 50 mol % and the placticsizer is added in quantities ranging from 10 to 90 mol %.

The invention will now be described in greater detail with reference to the following non-limiting examples.

EXAMPLE 1: Preparation of polyether with terminal groups chlorinated (PEC)

To a reaction vessel were charged 10 ml of SOCl$_2$ and 35 ml of poly(ethylene glycol)(PEG) (molecular weight 400). The mixture was refluxed under dry nitrogen flow for 4 days to convert the terminal hydroxy groups to chloride. FT-IR and NMR were used to monitor the reaction to ensure the completion of the conversion. After all the hydroxy groups had been converted to chloride, the mixture was vacuum dried for 48 hours, and a polyether with terminal groups chlorinated(PEC) was obtained. The resulting compound was stored in a desiccator.

EXAMPLES 2-5: Preparation of PVDF/PEC/LiBF$_4$ polymeric electrolyte

Poly(vinylidene fluoride) (PVDF), PEC and LiBF$_4$ were mixed according to the molar ratio as indicated in Table 1, dissolved in N,N-dimethylacetamide(DMA), and stirred for 48 hours at 80° C. The resulting solution was then coated on a glass plate. After removing solvent in a vacuum oven at 130° C. for 24 hours, the resultant film was further dried at room temperature with dry air. The obtained polymeric electrolyte film was stored in a desiccator for testing. The ionic conductivities were measured by using a Du Pont Dielectric Analyzer (Model 2970) under dry nitrogen having a flow rate of 500 c.c./min, at a heating rate of 3° C./min and a frequency of 300,000 Hz. The results were shown in Table 1.

TABLE 1

PVDF/plasticizer/LiBF$_4$ polymeric electrolyte

| Examples | PVDF/PEC/ PEG/LiBF$_4$ (molar ratio) | ionic conductivities (S/cm) at 30° C. |
|---|---|---|
| Example 2 | 20/80/0/5 | $1.0 \times 10^{-4}$ |
| Example 3 | 20/80/0/25 | $4.2 \times 10^{-5}$ |
| Example 4 | 12/88/0/4 | $1.0 \times 10^{-4}$ |
| Example 5 | 80/20/0/25 | $8.5 \times 10^{-7}$ |
| Comparative Example 1 | 100/0/0/25 | $1.0 \times 10^{-7}$ |
| Comparative Example 2 | 100/0/0/6 | $1.0 \times 10^{-7}$ |
| Comparative Example 3 | 20/0/80/6 | $1.0 \times 10^{-5}$ |
| Comparative Example 4 | 80/0/20/25 | $1.2 \times 10^{-9}$ |

EXAMPLES 6–8: Preparation of PEO/PEC/LiBF$_4$ polymeric electrolyte

The same procedures as described in Examples 2–5 were employed, except that PVDF was replaced by poly(ethylene oxide)(PEO) as a polymeric matrix. The compositions and conductivities measured are summarized in Table 2.

TABLE 2

PEO/PEC/LiBF$_4$ polymeric electrolyte

| Examples | PEO/PEC/LiBF$_4$ (molar ratio) | ionic conductivities (S/cm) at 30° C. |
|---|---|---|
| Example 6 | 80/20/25 | $2.4 \times 10^{-6}$ |
| Example 7 | 20/80/26 | $8.8 \times 10^{-5}$ |
| Example 8 | 20/80/25 | $2.5 \times 10^{-5}$ |
| Comparative Example 5 | 100/0/25 | $5.0 \times 10^{-7}$ |

COMPARATIVE EXAMPLES 1, 2: Preparation of PVDF/LiBF$_4$ polymeric electrolyte The same procedures as described in Example 2–5 were employed, except that no plasticizer PEC was added. The compositions and conductivities measured are summarized in Table 1.

COMPARATIVE EXAMPLES 3, 4: Preparation of PVDF/PEG/LiBF$_4$ polymeric electrolyte The same procedures as described in Example 2–5 were employed, except that PEC was replaced by poly(ethylene glycol)(PEG) as a plasticizer. The compositions and conductivities measured are summarized in Table 1.

COMPARATIVE EXAMPLES 5: Preparation of PEO/LiBF$_4$ polymeric electrolyte

The same procedures as described in Example 6–8 were employed, except that no PEC plasticizer was added. The compositions and conductivities measured are summarized in Table 2.

As shown in Table 1 and Table 2, if PEC is added to a polymeric electrolyte which contains PVDF or PEO as a polymer matrix and LiBF$_4$ as a dissociable salt, the ionic conductivity can be improved. When the PEC is suitably added, the room temperature conductivity can reach $10^{-4}$ S/cm, which can only be obtained at 100° C. for the PEO/LiBF$_4$ polymeric electrolyte with no addition of PEC. It also can be seen from Table 1 that the conductivity of the polymeric electrolyte dramatically decreases when a lower content of PEG as is added, and even when a higher content of PEG is added, the conductivity Can only reaches $10^{-5}$ S/cm which is one-tenth of that of the polymeric electrolyte plasticized with PEC. Moreover, as PEG contains reactive terminal hydroxy groups, the chemical properties of the resultant polymeric electrolytes are not desirable.

What is claimed is:

1. A polymeric electrolyte comprising:
   (a) from 10 to 95 mol % of a polar polymer matrix;
   (b) from 2 to 50 mol % of a dissociable salt; and
   (c) from 10 to 90 mol % of the polyether oligomer having the structure:

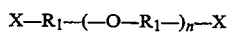

wherein X is a halogen atom selected from the group consisting of fluorine, chlorine and bromine; $R_1$ is an aliphatic group having less than twelve carbon atoms; and the polymerization degree n is less than 250.

2. The polyether oligomer as claimed in claim 1, wherein the polymerization degree n is less than 50.

3. The polymeric electrolyte as claimed in claim 1, wherein the polar polymer matrix is a polymer selected from the group consisting of poly(acrylonitrile), poly(halogenated alkene), polyether, polyester, polyamide, polyimide, polycarbonate, poly(ether ketone), polysulfone, poly(ether sulfone), poly(p-phenylene sulfide), polysiloxane, epoxy resin, polyurethane and poly(phosphazine).

4. The polymeric electrolyte as claimed in claim 1, wherein the dissociable salt is a salt selected from the group consisting of alkali metal salt, alkaline earth metal salt, transition metal salt and organic salt.

5. The polymeric electrolyte as claimed in claim 4, wherein the alkali metal salt is a salt selected from the group consisting of lithium salt, sodium salt and potassium salt.

6. The polymeric electrolyte as claimed in claim 5 wherein the lithium salt is a salt selected from the group consisting of LiCF$_3$CO$_2$, LiCF$_3$SO$_3$, LiBF$_4$, LiB(C$_6$H$_5$)$_4$, LiClO$_4$, LiSCN, LiNO$_3$, LiNO$_2$ and LiI.

* * * * *